Aug. 25, 1959 M. B. STRAUSE 2,901,352
PIE MARKER, METHOD OF FINISHING MERINGUE PIES
AND THE RESULTING MERINGUE PIE
Filed May 24, 1951 2 Sheets-Sheet 1
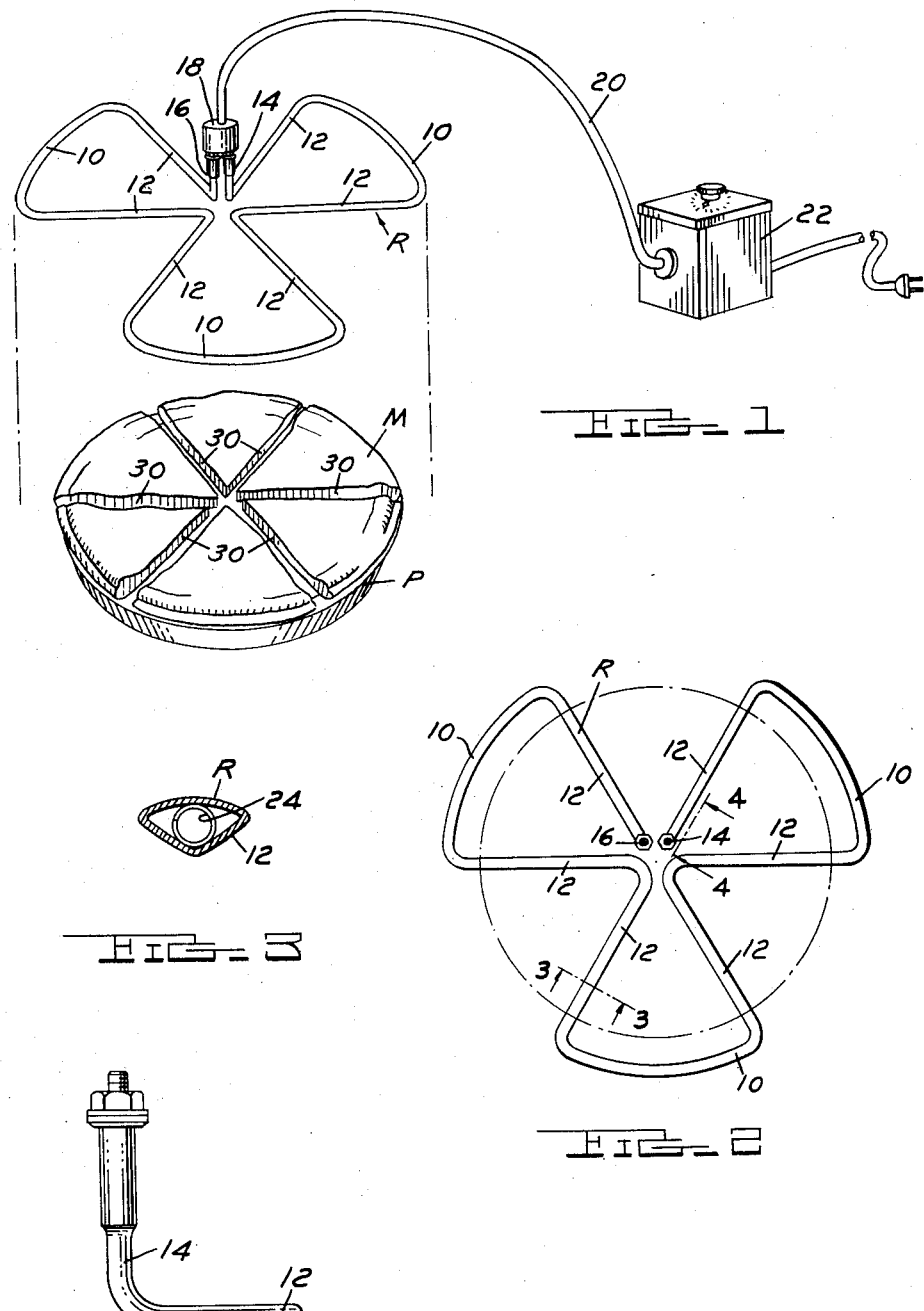
INVENTOR.
MONROE BOSTON STRAUSE
BY
Barnes, Kisselle, Laughlin & Raisch
ATTORNEYS Aug. 25, 1959  M. B. STRAUSE  2,901,352
PIE MARKER, METHOD OF FINISHING MERINGUE PIES
AND THE RESULTING MERINGUE PIE
Filed May 24, 1951  2 Sheets-Sheet 2
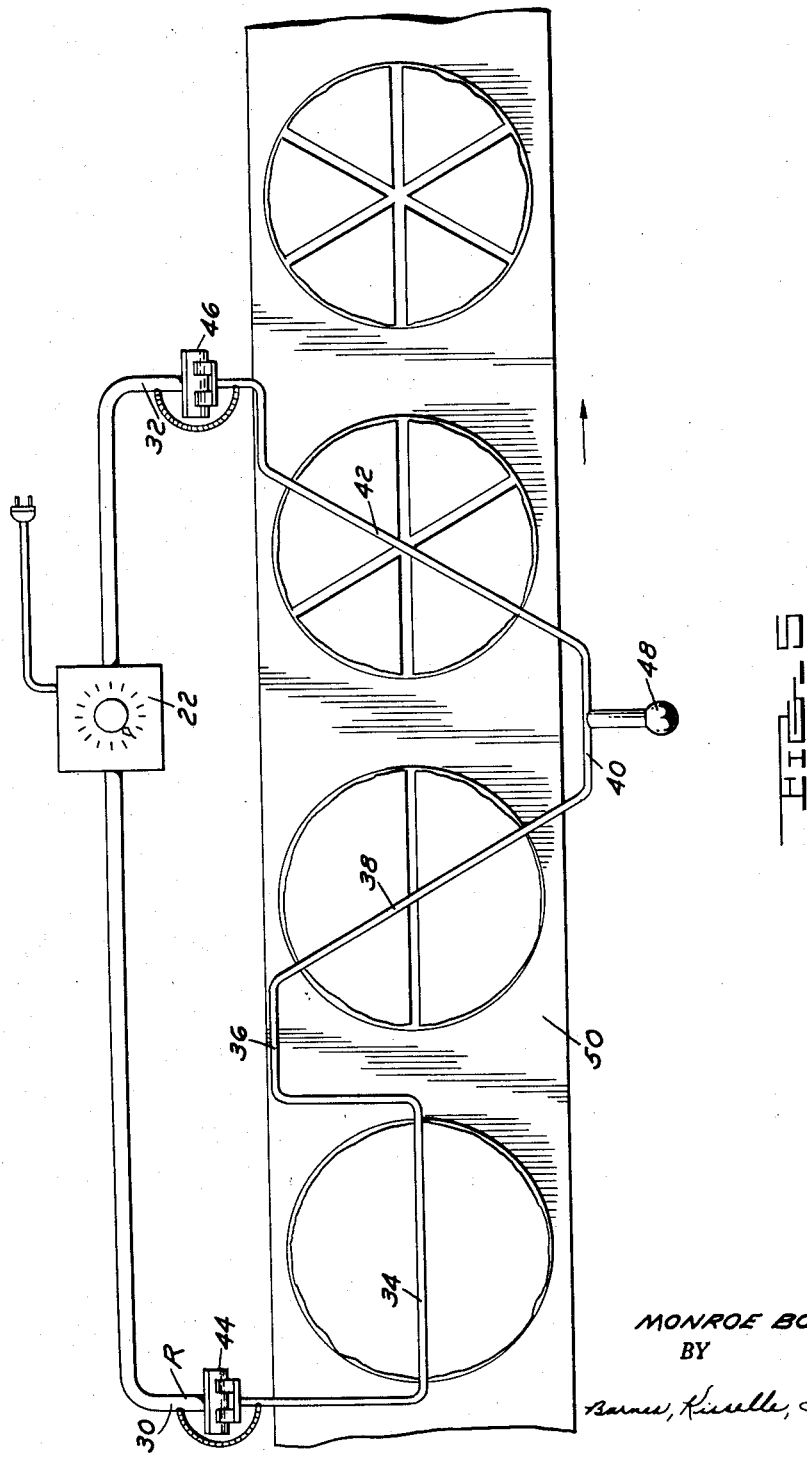
INVENTOR.
MONROE BOSTON STRAUSE
BY
Barnes, Kisselle, Laughlin & Raisch
ATTORNEYS

United States Patent Office 2,901,352
Patented Aug. 25, 1959

2,901,352

PIE MARKER, METHOD OF FINISHING MERINGUE PIES AND THE RESULTING MERINGUE PIE

Monroe Boston Strause, San Diego, Calif.

Application May 24, 1951, Serial No. 228,045

4 Claims. (Cl. 99—92)

This invention relates to a pie marker and has particularly to do with a device which may be used on meringue pies to indicate a marking position and also to toast the sides of the meringue on either side of the cut.

The resulting pie has an attractive appearance from a design point of view and also is practically marked for convenient cutting, and due to the toasting of the sides of the marked channels prevents gumming up of the knife used in the cutting.

Briefly, the invention consists of a toasting rod which in one form of assembly may comprise segmental sections 120 degrees apart, each section having two radial portions which define six marking channels in the meringue of the pie.

Other objects of the invention will be apparent in the following description and claims.

Drawings accompany the application, and the various views thereof may be briefly described as:

Figure 1, a view of the marking unit in raised position from a pie.

Figure 2, a plan view of the marking unit.

Figures 3 and 4, sectional views on lines 3—3 and 4—4 of Figure 2.

Figure 5, an illustration of a modified construction for use in marking a large quantity of pies progressively.

Referring to the drawings, a meringue pie P is shown in Figure 1 having a meringue topping M. Above the pie is shown the toasting rod R which consists of segmental sections 10, each having radial portions 12 extending outwardly to the connecting arcuate portions.

Two vertical risers 14 and 16 rise from the center of the unit for connection to a plug unit 18 on the end of a lead wire 20 coming from a timer and thermostat unit 22. The rod R has a cross section as shown in Figure 3 of approximate triangular shape with curved sides to push the meringue to each side as it travels down, and within the rod is a resistance unit 24 suitably insulated from the rod adapted to heat the rod to desired toasting temperature, which will be approximately 450° F. to 600° F.

The device may be formed with additional segmental portions if additional pieces are desired from the particular pie. In the present case, six pieces will be outlined.

In operation, the rod is heated electrically and maintained at a certain temperature by the unit 22. When heated properly, it may be brought down on a pie vertically; and since the segmental sections 10 have a diameter greater than the pie, the edge of the pie tin or the crust will limit the downward movement.

The radial portions 12 will enter the meringue cover of the pie and toast the sides 30 while removing a channel portion between each cut. The pie may then be cut at the convenience of the user along the indicated channels. In large production the marker may be mounted for vertical motion and pies may be conveyed under the marker as shown in Figure 5, to be later described. The lead wire 20 has sufficient flexibility to permit the motion.

The device, of course, is primarily usable in commercial establishments where even cut is a necessity and where sometimes an attractive display of a pie prior to the use makes the difference between a sale or no sale.

In Figure 5, I have shown a device which may be used for the marking of pies in large quantities. In this case, the rod R is shaped with leads 30 and 32 leading from the timer and thermostat unit 22. Lead 30 comes to a diametrical portion 34 and then angles off to the side in an L-shaped part 36 to reach another diametrical portion 38 at 60 degrees to the first unit 34.

Then, through a connector 40, the rod continues in a third diametrical portion 42 lying again at 60 degrees to the first diametrical portion and at 60 degrees to the second diametrical portion, the last portion 42 connecting to the lead 32.

The toasting rod is connected to the leads 30 and 32 at pivotal connections 44 and 46 so that the pie contacting portions may be elevated by the use of an insulated handle 48. Below the toasting unit is a conveyor 50 for indexing pies one at a time to a position below the markers 34, 38 and 42. It is then necessary only to bring down the heated rods over the three pies as they index along the conveyor in order to get the markings of the pie pieces.

This particular device is advantageous when pies are freshly baked since it involves toasting only one diametrical portion at a time and does not disturb the entire meringue simultaneously.

The remainder of the construction of the rod as used in Figure 5 is the same as that used in the previous figures.

The rod itself is preferably formed of some non-corrosive type of metal which has a fairly smooth finish.

It will be understood that the rod or arrangements of rods may take many different forms and also that the working temperature of the rod may be varied in accordance with the type of meringue being cut.

The essential point is that the temperature is such that the slot in the meringue will be formed and the meringue itself will be toasted without the meringue sticking to the rod.

It will also be understood that the toasting rod or rods may be so positioned above the pie to be cut that if the pie is moved along beneath the heated rod or rods the upper surface of the meringue will be toasted, thus eliminating the normal step of toasting the top of the meringue by inserting it in the oven for a short time; in other words, the rod for marking the meringue and toasting the marked portions may also be used for toasting the top of the meringue.

It will also be understood that not only does the marked meringue pie have an attractive appearance from a design standpoint, but the individual pieces of pie also have an attractive appearance in that the sides as well as the top of the meringue will be toasted and there will be a very small shoulder between the top of the filling of each slice of pie and the toasted edge of the meringue.

The final slice of pie also presents a new and unexpected thrill in the art of pie eating in that the toasted sides of the meringue not only makes the cutting of the pie by the fork different, but the toasted sides give an entirely different taste experience.

It will also be understood that while the channeling and toasting rods may be brought down to a position just short of the filler, in the preferred manner of using the rods they will be moved all the way to the filler so that the filling of the pie will be exposed through the respective channels.

What I claim is:

1. A pie marker for cutting channels in the meringue of the pie and toasting the sides of the channels in the meringue portion comprising an electric resistance rod formed in radial segmental portions, each having radial sides at equal angles to each other and means to control the flow of current through said resistance rod to control the temperature thereof to a toasting temperature for meringue.

2. As a new article of manufacture, a meringue pie having channels formed in the meringue to define pie sections, the channels extending to a point adjacent the filling of the pie and being considerably wider than the width of a knife blade used for cutting the pie, the vertical side walls of said channels being toasted.

3. The method of finishing filled and meringue-covered pies prior to cutting which comprises heating a treating rod to a predetermined temperature, holding said rod in a horizontal position and lowering it while heated into the meringue of a pie to be treated to a depth substantially approaching the filling of the pie to remove radial sections of the meringue adjacent defined segments thereof, and utilizing the heat of said rod to toast the remaining vertical sides of the meringue.

4. The method of finishing filled and meringue-covered pies prior to cutting which comprises heating a treating rod to a predetermined temperature, holding said rod in a horizontal position and passing a pie horizontally under said rod to toast the top surface of the meringue, lowering the rod while heated through the meringue to remove a radial section of the meringue adjacent defined segments, and utilizing the heat of said rod to toast the remaining vertical sides of the meringue.

References Cited in the file of this patent

UNITED STATES PATENTS

| | | | |
|---|---|---|---|
| 794,130 | Sons | July 4, | 1905 |
| 931,605 | Hermensen et al. | Aug. 17, | 1909 |
| 1,015,892 | Jefferson | Jan. 30, | 1912 |
| 1,474,640 | Pinkosh | Nov. 20, | 1923 |
| 1,519,752 | Bannister | Dec. 16, | 1924 |
| 1,607,009 | March | Nov. 16, | 1926 |
| 1,706,227 | Gray | Mar. 19, | 1929 |
| 1,725,835 | Smith | Aug. 27, | 1929 |
| 1,777,830 | Estrin | Oct. 7, | 1930 |
| 1,814,485 | Moss | July 14, | 1931 |
| 1,834,718 | Lastomirsky et al. | Dec. 1, | 1931 |
| 1,841,494 | Mears | Jan. 19, | 1932 |
| 1,890,044 | Policastro et al. | Dec. 6, | 1932 |
| 1,959,011 | Trompeter | May 15, | 1934 |
| 2,021,597 | Frost | Nov. 19, | 1935 |
| 2,156,832 | Ayers | May 2, | 1939 |
| 2,160,783 | McDonald | May 30, | 1939 |
| 2,246,719 | Burnham | June 24, | 1941 |
| 2,312,814 | Harriss et al. | Mar. 2, | 1943 |
| 2,394,322 | McKee | Feb. 5, | 1946 |
| 2,435,047 | McKee | Jan. 27, | 1948 |
| 2,483,669 | Reid | Oct. 4, | 1949 |
| 2,520,522 | Adams | Aug. 29, | 1950 |
| 2,547,206 | Hanau | Apr. 3, | 1951 |

FOREIGN PATENTS

| | | | |
|---|---|---|---|
| 13,187 | Great Britain | June 26, | 1905 |